United States Patent
Ogawa et al.

(10) Patent No.: US 11,778,635 B2
(45) Date of Patent: *Oct. 3, 2023

(54) INTEGRATED CIRCUIT FOR RECEIVING DOWNLINK CONTROL INFORMATION AND TRANSMITTING UPLINK DATA

(71) Applicant: Sun Patent Trust, New York, NY (US)

(72) Inventors: Yoshihiko Ogawa, Kanagawa (JP); Akihiko Nishio, Osaka (JP); Daichi Imamura, Kanagawa (JP); Seigo Nakao, Osaka (JP); Masayuki Hoshino, Kanagawa (JP); Takashi Iwai, Ishikawa (JP); Sadaki Futagi, Ishikawa (JP)

(73) Assignee: Sun Patent Trust, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/718,154

(22) Filed: Apr. 11, 2022

(65) Prior Publication Data
US 2022/0240298 A1    Jul. 28, 2022

Related U.S. Application Data

(63) Continuation of application No. 16/896,968, filed on Jun. 9, 2020, now Pat. No. 11,330,618, which is a (Continued)

(30) Foreign Application Priority Data

Feb. 13, 2009    (JP) .................................. 2009-031652

(51) Int. Cl.
*H04W 72/12*    (2023.01)
*H04W 72/23*    (2023.01)
(Continued)

(52) U.S. Cl.
CPC ............... *H04W 72/23* (2023.01); *H04L 1/00* (2013.01); *H04L 1/0004* (2013.01);
(Continued)

(58) Field of Classification Search
CPC ............. H04W 72/23; H04W 72/0453; H04W 72/0466; H04W 72/0473; H04W 72/1268;
(Continued)

(56) References Cited

U.S. PATENT DOCUMENTS

| 7,508,751 B2 | 3/2009 | Byun et al. |
| 2005/0265227 A1 | 12/2005 | Byun et al. |

(Continued)

FOREIGN PATENT DOCUMENTS

| CN | 101127719 A | 2/2008 |
| CN | 101346959 A | 1/2009 |

(Continued)

OTHER PUBLICATIONS

3GPP TSG RAN1 #56, "DCI for uplink non-contiguous RB allocations," Motorola, R1-090802, Athens, Greece, Feb. 9-13, 2009, pp. 1-5.

(Continued)

*Primary Examiner* — Kiet Tang
(74) *Attorney, Agent, or Firm* — Seed IP Law Group LLP

(57) ABSTRACT

Communication apparatuses and methods reduce the amount of signaling while maintaining a high scheduling gain. A determination unit stores a correspondence between the number of code words and the number of clusters to reduce the maximum value for the number of clusters allocated to each terminal as the number of code words increases, and thus determines the maximum value for the number of clusters based on the number of code words acquired. Based on the number of code words for a transmission signal from a terminal, an estimated value for the (Continued)

reception quality that is output by an estimation unit, and the maximum value for the number of clusters that is output by the determination unit, a scheduling unit schedules the allocation of the transmission signal transmitted by each terminal to a transmission band frequency (frequency resource) so as not to exceed the maximum value for the number of clusters.

10 Claims, 13 Drawing Sheets

Related U.S. Application Data continuation of application No. 16/053,241, filed on Aug. 2, 2018, now Pat. No. 10,716,132, which is a continuation of application No. 15/698,103, filed on Sep. 7, 2017, now Pat. No. 10,075,974, which is a continuation of application No. 15/258,849, filed on Sep. 7, 2016, now Pat. No. 9,788,343, which is a continuation of application No. 14/810,915, filed on Jul. 28, 2015, now Pat. No. 9,467,994, which is a continuation of application No. 14/227,987, filed on Mar. 27, 2014, now Pat. No. 9,125,198, which is a continuation of application No. 13/148,890, filed as application No. PCT/JP2010/000879 on Feb. 12, 2010, now Pat. No. 8,737,329.

(51) Int. Cl.
  *H04W 72/1268* (2023.01)
  *H04L 27/26* (2006.01)
  *H04L 1/00* (2006.01)
  *H04W 72/044* (2023.01)
  *H04L 5/00* (2006.01)
  *H04W 72/0453* (2023.01)
  *H04W 28/06* (2009.01)
  *H04W 84/04* (2009.01)

(52) U.S. Cl.
  CPC .......... *H04L 5/0023* (2013.01); *H04L 5/0041* (2013.01); *H04L 5/0064* (2013.01); *H04L 5/0092* (2013.01); *H04L 27/2601* (2013.01); *H04L 27/2607* (2013.01); *H04L 27/2614* (2013.01); *H04W 72/0453* (2013.01); *H04W 72/0466* (2013.01); *H04W 72/0473* (2013.01); *H04W 72/1268* (2013.01); *H04L 1/0041* (2013.01); *H04L 1/0045* (2013.01); *H04L 5/006* (2013.01); *H04L 5/0028* (2013.01); *H04L 27/2636* (2013.01); *H04L 27/2647* (2013.01); *H04W 28/06* (2013.01); *H04W 72/12* (2013.01); *H04W 84/042* (2013.01)

(58) Field of Classification Search
  CPC ... H04W 28/06; H04W 72/12; H04W 84/042; H04L 1/00; H04L 1/0004; H04L 5/0023; H04L 5/0041; H04L 5/0064; H04L 5/0092; H04L 27/2601; H04L 27/2607; H04L 27/2614; H04L 1/0041; H04L 1/0045; H04L 5/0028; H04L 5/006; H04L 27/2636; H04L 27/2647

See application file for complete search history.

(56) References Cited

U.S. PATENT DOCUMENTS

| | | | |
|---|---|---|---|
| 2005/0286402 A1 | 12/2005 | Byun et al. | |
| 2007/0173258 A1 | 7/2007 | Sano | |
| 2010/0115360 A1 | 5/2010 | Seok et al. | |
| 2010/0142455 A1* | 6/2010 | Imamura | H04W 52/146 370/329 |
| 2011/0096658 A1* | 4/2011 | Yang | H04L 27/2636 370/210 |
| 2011/0211549 A1* | 9/2011 | Au | H04W 72/0453 370/329 |

FOREIGN PATENT DOCUMENTS

| | | |
|---|---|---|
| EP | 2 348 659 A1 | 7/2011 |
| KR | 10-0800795 B1 | 2/2008 |
| WO | 2007/050921 A2 | 5/2007 |

OTHER PUBLICATIONS

3GPP TSG-RAN WG1 Meeting #55bis, "Transport block mapping and DL control signaling in LTE-Advanced," Nokia, Nokia Siemens Networks, R1-090233, Ljubljana, Slovenia, Jan. 12-16, 2009, pp. 1-7.
3GPP TSG RAN WG1 Meeting #56, "Codeword discussion for LTE-A," Panasonic, R1-090691, Athens, Greece, Feb. 9-13, 2009, pp. 1-2.
3GPP TSG RAN1 #53, "Proposals on PHY related aspects in LTE Advanced Agenda item: 6.2," R1-081752, Kansas City, Missouri, May 5-9, 2008, pp. 1-12.
3GPP TSG RAN WG1 Meeting #55bis, "Investigation on Uplink Radio Access Scheme for LTE-Advanced," NTT DOCOMO, INC., R1-090308, Ljubljana, Slovenia, Jan. 12-16, 2009, pp. 1-8.
3GPP TSG RAN WG1 Meeting #55, "Comparison between Clustered DFT-s-OFDM and OFDM for supporting non-contiguous RB allocation within a component carrier," Panasonic, R1-084225, Nov. 10-14, 2008, pp. 1-7.
3GPP TSG RAN WG1 Meeting #46bis, "Signaling for downlink scheduling: separate vs. joint coding," ETRI, R1-062585, Oct. 9-13, 2006, pp. 1-10.
3GPP TSG RAN WG1 #56, "Control Signaling for Non-Contiguous UL Resource Allocations," Samsung, R1-090612, Athens, Greece, Feb. 9-13, 2009, pp. 1-5.
English translation of Chinese Search Report dated Aug. 26, 2013, for Chinese Application No. 201080007514X.
Extended European Search Report, dated Oct. 8, 2015, for European Application No. 10741106.8-1851.
Extended European Search Report, dated Jan. 30, 2017, for European Application No. 16202480.6-1875.
International Search Report, dated May 18, 2010, for International Application No. PCT/JP2010/000879.
Indian Office Action, dated Sep. 25, 2018, Indian Patent Application No. 1645/MUMNP/2011. (6 pages).
Indian Office Action, dated Oct. 20, 2021, for Indian Application No. 201828045381. (7 pages).
Indian Hearing Notice dated Oct. 9, 2020, for the corresponding Indian Patent Application No. 1645/MUMNP/2011. (2 pages).

\* cited by examiner

| SYSTEM BANDWIDTH $N_{RB}$=100RB | | NUMBER OF CODEWORDS | | | |
|---|---|---|---|---|---|
| | | 1 | 2 | 3 | 4 |
| NUMBER OF CLUSTERS | 1 | 24 (BITS) | 35 | 46 | 57 |
| | 2 | 35 | 46 | 61 | 72 |
| | 3 | 56 | 67 | 78 | 89 |
| | 4 | 63 | 74 | 85 | 96 |

FIG.2

| SYSTEM BANDWIDTH $N_{RB}=100RB$ | | NUMBER OF CODEWORDS | | | |
|---|---|---|---|---|---|
| | | 1 | 2 | 3 | 4 |
| NUMBER OF CLUSTERS | 1 | 24 (BITS) | 35 | 46 | 57 |
| | 2 | 35 | 46 | 61 | 72 |
| | 3 | 56 | 67 | 78 | 89 |
| | 4 | 63 | 74 | 85 | 96 |

FIG.5

| SYSTEM BANDWIDTH $N_{RB}$=100RB | | NUMBER OF CODEWORDS | | | |
|---|---|---|---|---|---|
| | | 1 | 2 | 3 | 4 |
| NUMBER OF CLUSTERS | 1 | 24 (BITS) | 35 | 46 | 57 |
| | 2 | 35 | 46 | 61 | 72 |
| | 3 | 56 | 67 | 78 | 89 |
| | 4 | 63 | 74 | 85 | 96 |

FIG.8

| AVAILABLE START/END RB | NUMBER OF CODEWORDS | | | |
|---|---|---|---|---|
| | 1 | 2 | 3 | 4 |
| | UNITS OF 1 RB | UNITS OF 2 RBs | UNITS OF 3 RBs | UNITS OF 4 RBs |

FIG.9

| SYSTEM BANDWIDTH NRB=100RB | | NUMBER OF LAYERS OR NUMBER OF STREAMS | | | |
|---|---|---|---|---|---|
| | | 1 | 2 | 3 | 4 |
| NUMBER OF CLUSTERS | 1 | 24 (BITS) | 35 | 46 | 57 |
| | 2 | 35 | 46 | 61 | 72 |
| | 3 | 56 | 67 | 78 | 89 |
| | 4 | 63 | 74 | 85 | 96 |

FIG.12

| AVAILABLE START/END RB | NUMBER OF LAYERS OR NUMBER OF STREAMS | | | |
|---|---|---|---|---|
| | 1 | 2 | 3 | 4 |
| | UNITS OF 1 RB | UNITS OF 2 RBs | UNITS OF 3 RBs | UNITS OF 4 RBs |

FIG.13

INTEGRATED CIRCUIT FOR RECEIVING DOWNLINK CONTROL INFORMATION AND TRANSMITTING UPLINK DATA

TECHNICAL FIELD

The present invention relates to a communication apparatus and a communication method.

BACKGROUND ART

In uplink of 3rd generation partnership project long term evolution (3GPP LTE), consecutive bands are allocated to individual terminals. In each band, data signals and pilot signals are time-multiplexed and transmitted.

Notification information for each terminal includes transmission band information and control information. Here, the transmission band information includes start and end resource block (RB) numbers of an allocation band (a minimum bandwidth is set to 1 RB) determined from a system bandwidth NRB. The number of notification bits of the start and end RB numbers is expressed by following equation 1.

(Equation 1)

$$\lceil \log_2({}_{N_{RB}+1}C_2) \rceil = \left\lceil \log_2\left(\frac{(N_{RB}+1)(N_{RB})}{2!}\right) \right\rceil \quad [1]$$

Further, the control information includes 5-bit modulation and coding scheme (MCS) information, 2-bit TCP command information, 1-bit new data indicator (NDI) information, 3-bit cyclic shift information, and the like. That is, in this example, the number of bits to be required for notification of control information is 11.

In Non-Patent Literature 1, in addition to consecutive band allocation in uplink of LTE-Advanced which is a developed version of 3GPP LTE, allocating non-consecutive bands (non-consecutive allocation) is discussed (see FIG. 1). Flexible frequency scheduling is possible thanks to allocating non-consecutive bands. Further, in the non-consecutive allocation, allocated consecutive bands are called a cluster.

Meanwhile, in Non-Patent Literature 2, multiple input multiple output (MIMO) transmission of data signals is discussed. In the MIMO transmission in LTE, transmission control (MCS control and the like) can be performed in units of codeword, and flexible space scheduling is possible. Further, a codeword represents a block, which is a retransmission unit of hybrid automatic repeat and request (HARQ).

When the non-consecutive allocation and the MIMO transmission are applied, a schedule gain based on space scheduling or frequency scheduling may increase.

CITATION LIST

Non-Patent Literature

NPL 1
R1-081752, "Proposals on PHY related aspects in LTE Advanced", 3GPP TSG RAN1 #53, Kansas City, Mo., USA, 5-9 May 2008

NPL 2
R1-090308, "Investigation on Uplink Radio Access Scheme for LTE-Advanced", 3GPP TSG RAN1 #55bis, Ljubljana, Slovenia, 12-16 Jan. 2009

SUMMARY OF INVENTION

Technical Problem

In the non-consecutive allocation, when the system bandwidth is denoted by NRB and the number of clusters is denoted by Ncluster, the number of bits of an allocated band is expressed by the following Equation 2.

(Equation 2)

$$\lceil \log_2({}_{N_{RB}+1}C_{2N_{cluster}}) \rceil = \left\lceil \log_2\left(\frac{(N_{RB}+1)(N_{RB})\cdots(N_{RB}+1-2N_{cluster}+1)}{(2N_{cluster})!}\right) \right\rceil \quad [2]$$

In the MIMO transmission, 11-bit control information is necessary for each codeword.

Accordingly, as the number of codewords or the number of clusters increases, the amount of signaling to notify in a downlink control information (DCI) format increases (see FIGS. 2 and 3). The DCI format is a format for transmitting resource allocation information and control information.

For example, as shown in FIG. 3, if the number of codewords increases, the control information increases, and if the number of clusters increases, the resource allocation information increases. Further, as shown in FIG. 2 (on the assumption that the system bandwidth is 100 RBs), when the number of codewords is 1 and the number of clusters is 1, 24 bits are necessary. However, when the number of codewords is 2 and the number of clusters is 2, 46 bits are necessary.

It is therefore an object of the present invention to provide a communication apparatus and a communication method which reduce a signaling amount while securing a high scheduling gain.

Solution to Problem

A communication apparatus according to the present invention includes: a determination section that determines a maximum value of the number of clusters such that the maximum value of the number of clusters to allocate to another communication apparatus is reduced as the number of codewords of a transmission signal to allocate to the other communication apparatus increases; and a scheduling section that allocates a band of a transmission signal to be transmitted by the other communication apparatus based on the determined maximum value of the number of clusters.

A communication apparatus according to the present invention includes: a band identifying section that determines that a maximum value of the number of clusters to allocate to that communication apparatus is smaller as the number of codewords allocated to the communication apparatus is larger, and identifies a transmission band allocated to the communication apparatus, based on the number of codewords and the maximum value of the number of clusters; and a transmission section that transmits a data signal using the identified transmission band.

A communication method according to the present invention includes: determining a maximum value of the number of clusters such that the maximum value of the number of clusters to allocate to another communication apparatus is reduced as the number of codewords of a transmission signal to allocate to the other communication apparatus increases; and performing allocation of a band of a transmission signal to be transmitted by the other communication apparatus, based on the determined maximum value of the number of clusters.

Advantageous Effects of Invention

According to the present invention, it is possible to reduce a signaling amount while securing a high scheduling gain.

BRIEF DESCRIPTION OF DRAWINGS

FIG. 2 is a view illustrating signaling amounts in a case of applying MIMO transmission and the non-consecutive band allocation;

FIG. 5 is a view illustrating a state in which the maximum value of the number of clusters to allocate to each terminal is reduced as the number of codewords increases;

FIG. 8 is a view illustrating a state in which the maximum value of the number of clusters to allocate to each terminal is reduced as the number of codewords increases;

FIG. 9 is a view illustrating a state in which selectable start and end RBs vary according to the number of codewords;

FIG. 12 is a view illustrating a state in which the maximum value of the number of clusters to allocate to each terminal is reduced as the number of layers or the number of streams increases; and FIG. 13 is a view illustrating a state in which selectable start and end RBs vary according to the number of layers or the number of streams.

DESCRIPTION OF EMBODIMENTS

Hereinafter, embodiments of the present invention will be described in detail with reference to the drawings. In the embodiments, components having the identical function are denoted by the same reference symbols, and a redundant description will not be repeated.

Embodiment 1

Figure 1:
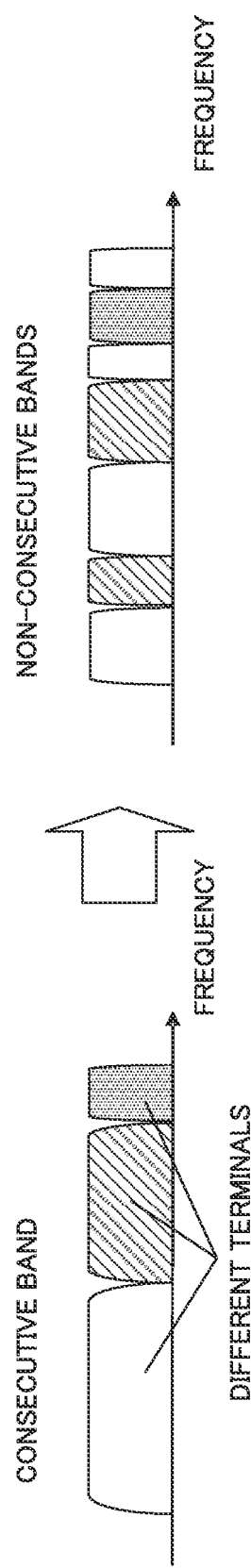
FIG. 1 is a view illustrating states of consecutive band allocation and non-consecutive band allocation.
Figure 3:
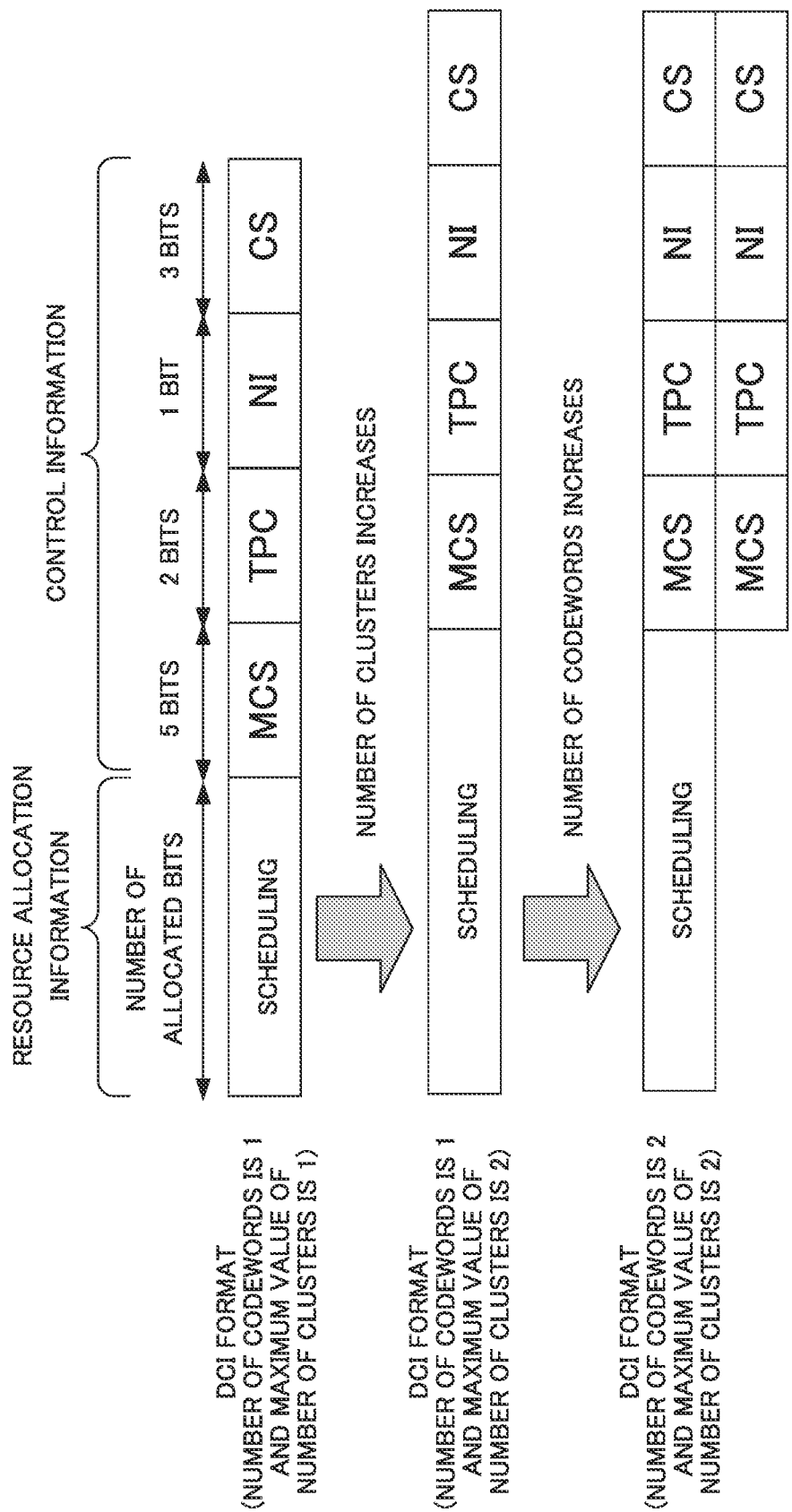
FIG. 3 is a view illustrating changes of the amount of signaling to notify in a DCI format in a case where the number of codewords or the number of clusters increases.
Figure 4:
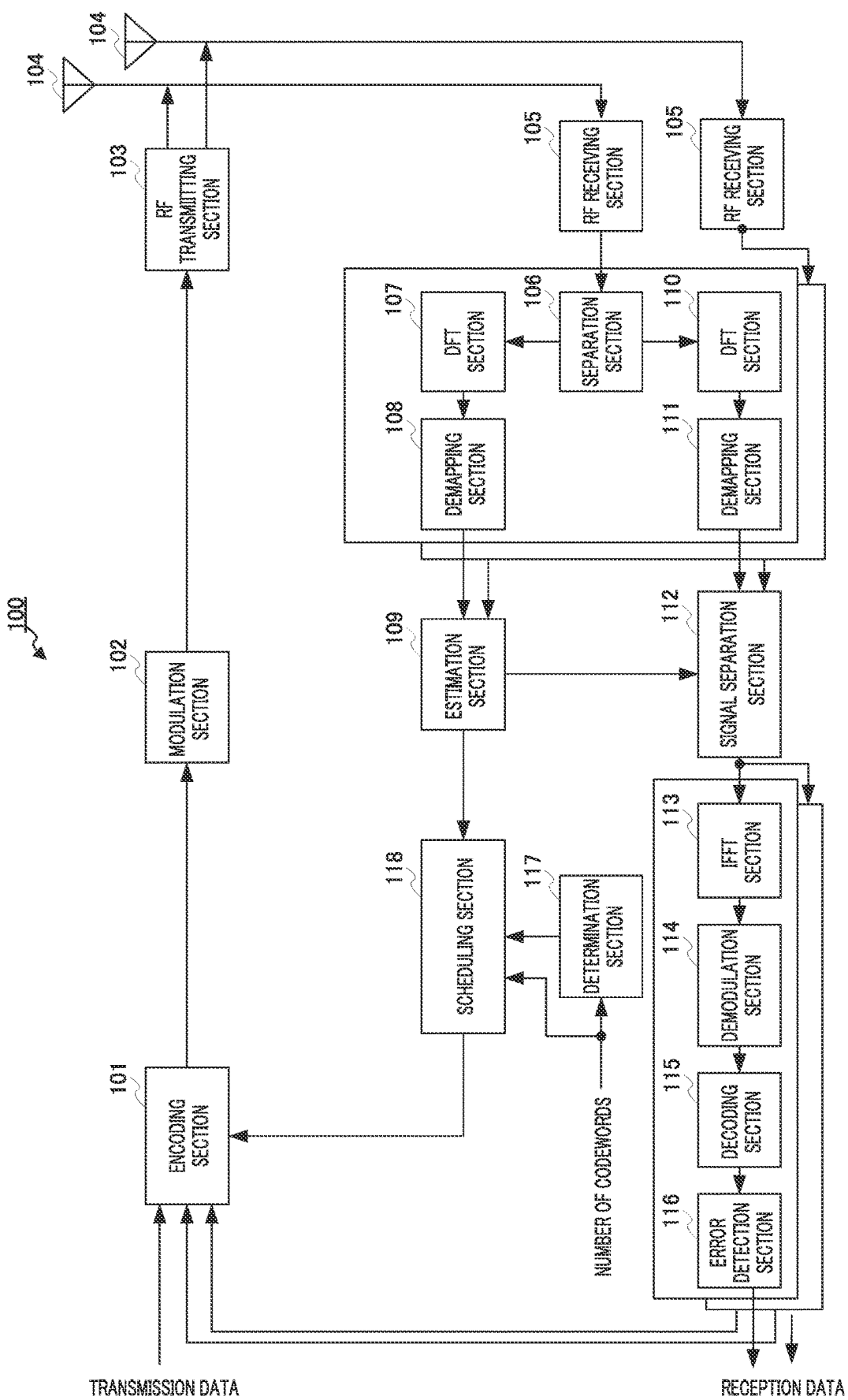
FIG. 4 is a block diagram illustrating a configuration of a base station according to Embodiment 1 of the present invention.

FIG. 4 is a block diagram illustrating a configuration of base station 100 according to Embodiment 1 of the present invention. In this figure, encoding section 101 acquires transmission data (downlink data), a response signal (an ACK signal or a NACK signal) input from error detection section 116 to be described below, resource allocation information of each terminal input from scheduling section 118 to be described below, control information representing an MCS, and the like. The response signal, the resource allocation information, and the control information constitute allocation control information. Encoding section 101 encodes the transmission data and the allocation control information, and outputs the encoded data to modulation section 102.

Modulation section 102 modulates the encoded data output from encoding section 101, and outputs the modulated signal to RF transmitting section 103.

RF transmitting section 103 performs predetermined transmission processes, such as D/A conversion, up-conversion, and amplification, on the modulated signal output from modulation section 102, and wirelessly transmits the signal having been subjected to the transmission processes to each terminal through one or more antennas 104.

RF receiving section 105 performs predetermined reception processes, such as down-conversion and A/D conversion, on a signal received from each terminal through antennas 104, and outputs the signal having been subjected to the reception processes to separation section 106.

Separation section 106 separates the signal output from RF receiving section 105 into a pilot signal and a data signal, and outputs the pilot signal and the data signal to discrete Fourier transform (DFT) section 107 and DFT section 110, respectively.

DFT section 107 section performs a DFT process on the pilot signal output from separation section 106 thereby to perform signal conversion from a time domain to a frequency domain. DFT section 107 outputs the converted pilot signal in the frequency domain to demapping section 108.

Demapping section 108 extracts a partial pilot signal corresponding to a transmission band of each terminal from the pilot signal in the frequency domain output from DFT section 107, and outputs each extracted pilot signal to estimation section 109.

Estimation section 109 estimates the frequency variation (that is, channel frequency response) and reception quality of a channel, based on the pilot signal output from demapping section 108. Estimation section 109 outputs an estimated value of channel frequency variation to signal separation section 112, and outputs an estimated value of reception quality to scheduling section 118.

Meanwhile, DFT section 110 performs a DFT process on the data signal output from separation section 106, thereby performing signal conversion from a time domain to a frequency domain. DFT section 110 outputs the converted data signal in the frequency domain to demapping section 111.

Demapping section 111 extracts a partial data signal corresponding to the transmission band of each terminal from the data signal in the frequency domain output from DFT section 110, and outputs each extracted data signal to signal separation section 112.

Signal separation section 112 weights and synthesizes the data signals output from demapping section 111 by using the estimated value of channel frequency variation output from estimation section 109, thereby separating the data signal so as to correspond to each layer. The separated data signal is output to Inverse Fast Fourier Transform (IFFT) section 113.

IFFT section 113 performs an IFFT process on the data signal output from signal separation section 112, and outputs the signal having been subjected to the IFFT process to demodulation section 114.

Demodulation section 114 performs a demodulation process on the signal output from IFFT section 113, and outputs the demodulated signal to decoding section 115.

Decoding section 115 performs a decoding process on the signal output from demodulation section 114, and outputs the decoded signal (decoded bit sequence) to error detection section 116.

Error detection section 116 performs error detection on the decoded bit sequence output from decoding section 115. For example, error detection section 116 performs error detection using a CRC check. When an error is detected from the decoded bits as a result of error detection, error detection section 116 generates a NACK signal as a response signal, and when no error is detected from the decoded bits, error detection section 116 generates an ACK signal as the response signal. The generated response signal is output to encoding section 101. In the case where there is no error in the decoded bits, the data signal is output as reception data.

Determination section 117 acquires the number of codewords of a transmission signal to allocate to the terminal from a control section or the like (not shown), and controls the maximum value of the number of clusters to allocate to each terminal according to the number of codewords. That is, as the number of codewords increases, the maximum value of the number of clusters to allocate to each terminal is reduced. Specifically, determination section 117 stores correspondence between the numbers of codewords and the numbers of clusters as shown in FIG. 5 in advance, and determines the maximum value of the number of clusters from the obtained number of codewords. The determined maximum value of the number of clusters is output to scheduling section 118. In FIG. 5, shaded portions indicate unused portions.

Scheduling section 118 schedules allocation of a transmission band (frequency resource) of a transmission signal transmitted by each terminal so as not to exceed the maximum value of the number of clusters, based on the number of codewords of the transmission signal to allocate to the terminal, which is acquired from the control section or the like (not shown), the estimated value of reception quality output from estimation section 109, and the maximum value of the number of clusters output from determination section 117. The allocation control information (for example, the resource allocation information and the control information) representing the scheduling result is output to encoding section 101.

Figure 6:
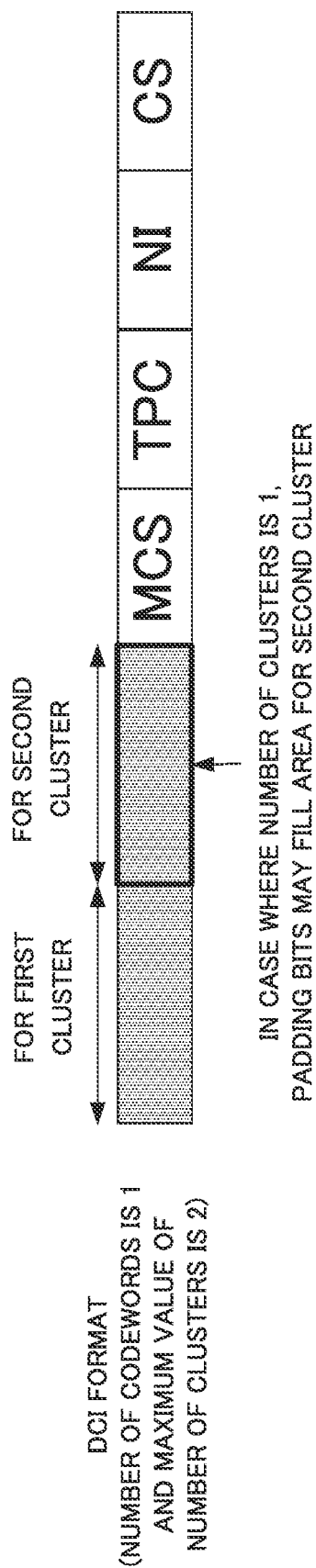
FIG. 6 is a view illustrating a state in which allocation control information is generated.

The allocation control information representing the scheduling result may be generated in correspondence with the maximum value of the number of clusters and the number of codewords. For example, in a case where the size of a DCI format varies according to the maximum value of the number of clusters and the number of codewords as shown in FIG. 2, and the number of clusters to allocate to a resource is 1 with respect to the maximum value of the number of clusters of 2 as shown in FIG. 6, a signaling area for the second cluster is filled with padding bits. Here, the padding bits refer to bits used for filling an available area of the DCI format. Further, the size of the DCI format may be unified to the largest size regardless of the maximum value of the number of clusters and the number of codewords, and the padding bits may fill in an area other than the signaling areas used for the resource allocation information and the control information. In this case, padding bits to equal in number the difference between the size of the DCI format and the size used for signaling are necessary.

Figure 7:
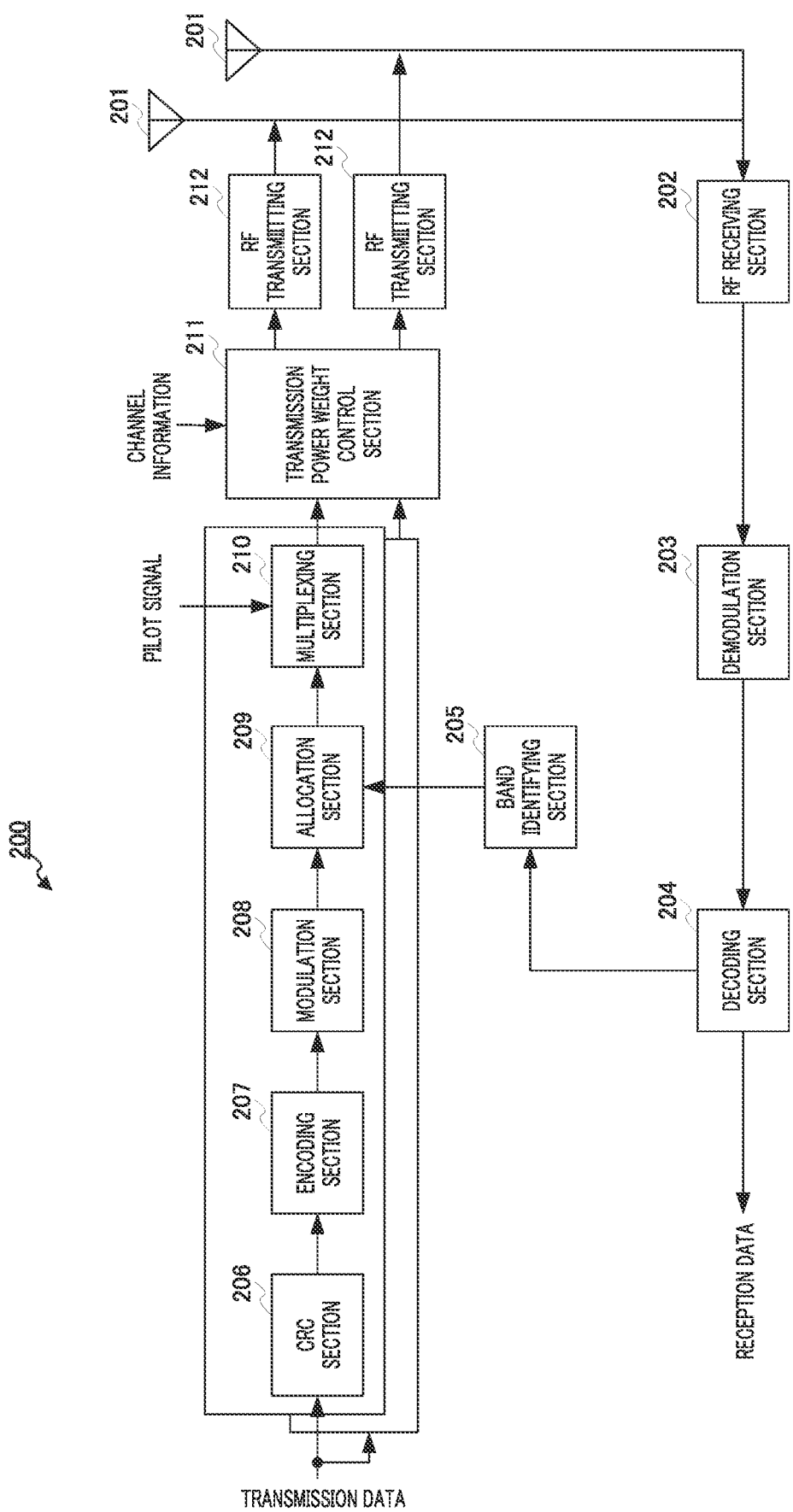
FIG. 7 is a block diagram illustrating a configuration of a terminal according to Embodiment 1 of the present invention.

FIG. 7 is a block diagram illustrating a configuration of terminal 200 according to Embodiment 1 of the present invention. In this figure, RF receiving section 202 performs predetermined reception processes, such as down-conversion and A/D conversion, on a signal received from the base station through antenna 201, and outputs the signal having been subjected to the reception processes to demodulation section 203.

Demodulation section 203 performs an equalization process and a demodulation process on the signal output from the RF receiving section 202, and outputs the processed signal to decoding section 204.

Decoding section 204 performs a decoding process on the signal output from demodulation section 203, and extracts reception data and allocation control information. The allocation control information includes the response signal (the ACK signal or the NACK signal), the resource allocation information, the control information, and information on the number of codewords. Decoding section 204 outputs the resource allocation information, the control information, and the information on the number of codewords out of the extracted allocation control information to band identifying section 205.

Band identifying section 205 determines the maximum value of the number of clusters to allocate to terminal 200, based on the number of codewords output from decoding section 204. That is, it is determined that the larger the number of codewords, the smaller the maximum value of the number of clusters to allocate to terminal 200. Specifically, band identifying section 205 stores the correspondence between the number of codewords and the number of clusters as shown in FIG. 5 in advance, determines the maximum value of the number of clusters based on the information on the number of codewords output from decoding section 204, extracts the resource allocation information and the control information for terminal 200 by using the maximum value of the number of clusters and the number of codewords, and identifies a transmission band allocated to terminal 200. For example, since the size of the DCI format varies according to the maximum value of the number of clusters and the number of codewords, band identifying section 205 determines the maximum value of the number of clusters based on the number of codewords input, and learns the size and structure of the DCI format as shown in FIG. 6, from the maximum value of the number of clusters and the number of codewords. Then, band identifying section 205 extracts the resource allocation information and the control information for terminal 200. In a case where the number of allocated clusters is smaller than the maximum value of the number of clusters, since the padding bits fill a partial signaling area of the resource allocation information, it is possible to learn the number of clusters.

Transmission data made of one or more codewords is divided and is input to CRC section 206. CRC section 206 performs CRC encoding on the input transmission data so as to generate CRC-encoded data, and outputs the generated CRC-encoded data to encoding section 207.

Encoding section 207 encodes the CRC-encoded data output from CRC section 206, and outputs the encoded data to modulation section 208.

Modulation section 208 modulates the encoded data output from encoding section 207, and outputs the modulated data signal to allocation section 209.

Allocation section 209 allocates the data signal output from modulation section 208 to a frequency resource (RB) based on the band information output from band identifying section 205. The data signal to allocate to the RB is output to multiplexing section 210.

Multiplexing section 210 time-multiplexes the pilot signal and the data signal output from allocation section 209, and outputs the multiplexed signal to transmission power weight control section 211.

Transmission power weight control section 211 multiplies each multiplexed signal output from multiplexing section 210 by a transmission power weight determined based on the channel information input from the control section or the like (not shown), and outputs the generated signal to RF transmitting section 212.

RF transmitting section 212 performs predetermined transmission processes, such as D/A conversion, up-conversion, and amplification, on the multiplexed signal output from multiplexing section 210, and wirelessly transmits the signal having been subjected to the transmission processes to the base station through antennas 201.

Next, the above-described correspondence between the number of codewords and the number of clusters stored in determination section 117 of the base station and band identifying section 205 of the terminal as shown in FIG. 5 will be described.

The number of codewords and the number of clusters have the correspondence relationship in which the maximum value of the number of clusters to allocate to each terminal is reduced as the number of codewords increases. For example, when the number of codewords is 1, the maximum value of the number of clusters is set to 4, and when the number of codewords is 2, the maximum value of the number of clusters is set to 3, and when the number of codewords is 4, the maximum value of the number of clusters is set to 1.

In this case, when the number of codewords is 1 and the maximum value of the number of clusters is 4, since the number of clusters is larger, it is possible to secure a scheduling gain by a frequency scheduling gain. Meanwhile, when the number of codewords is 4 and the maximum value of the number of clusters is 1, since the number of codewords is larger, it is possible to secure the scheduling gain by a space scheduling gain. Further, since a case where the number of codewords is 4 and the number of clusters is 4 or the like does not occur, it is possible to reduce the amount of signaling. Moreover, in a case where the number of codewords is large and the number of clusters is large, since the scheduling gain approaches the saturation, improvement effect by the scheduling gain from a case where there is only the space scheduling gain or the frequency scheduling gain is not great.

As described above, according to Embodiment 1, the maximum value of the number of clusters to allocate to each terminal is controlled according to the number of codewords of the transmission signal to allocate to the terminal. Therefore, it is possible to reduce the amount of signaling while securing a high scheduling gain. Further, by limiting that both of the number of clusters and the number of codewords become large. Therefore, it is possible to reduce the amount of signaling.

The maximum value of the number of clusters according to each number of codewords may be set such that the amount of signaling does not exceed a reference number of bits but is closest to the reference number of bits. For example, a case where the reference number of bits is set to 63 which is the number of bits when the number of codewords is 1 and the number of clusters is 4 is shown in FIG. 8. In this case, even when the number of codewords is 2, 3, or 4, the maximum value of the number of clusters is determined such that the number of notification bits does not exceed 63. For example, assuming that the number of codewords is 2, when the number of clusters is 3, since the number of notification bits is 67, exceeding 63 which is the reference number of bits, the maximum value of the number of clusters is set to 2. Even when the number of codewords is 3 or 4, the maximum value of the number of clusters is determined similarly. In FIG. 8, shaded portions show unused portions.

In this way, it is possible to use DCI formats having the same size regardless of the number of codewords while suppressing the number of padding bits.

In the present embodiment, a usable range may be limited to only a range in which the product of the number of codewords and the number of clusters is equal to or less than a predetermined value.

In the present embodiment, it has been described that the number of clusters varies according to the number of codewords. However, the number of clusters may vary according to the number of layers or the number of streams. For example, in a case where the number of codewords corresponds one-to-one with the number of layers or the number of streams, the number of codewords may be replaced with the number of layers or the number of streams. In a case where the number of codewords corresponds one-to-many with the number of layers or the number of streams, the number of codewords may be replaced with the number of layers or the number of streams. For example, in a case of changing the control information (cyclic shift and the like) in each layer or each stream even when the number of codewords is 1, the amount of control information increases as the number of layers or the number of streams increases. Accordingly, the number of clusters changes according to the number of layers or the number of streams.

Further, in the present embodiment, it has been described that the number of clusters varies according to the number of codewords. However, the correspondence relationship between these may be reversed such that the number of codewords varies according to the number of clusters. Thereby, it is possible to reduce the amount of signaling while securing a high scheduling gain. Further, as described above, the number of codewords for each number of clusters may be set such that the amount of signaling does not exceed the reference number of bits but is closest to the reference number of bits. For example, in a case where the reference number of bits is set to 63 which is the number of bits when the number of clusters is 4 and the number of codewords is 1, the number of codewords is determined as shown in FIG. 8. In this case, even when the number of clusters is 3, 2, or 1, the number of codewords is determined such that the number of notification bits does not exceed 63. When the number of clusters is 3, if the number of codewords is 2, the number of notification bits is 67, exceeding the reference number of bits. Accordingly, the maximum number of codewords is set to 1. Even when the number of clusters is 3 or 4, similarly, the number of codewords is set to 3 or 4 such that the number of notification bits does not exceed the reference number of bits. Therefore, it is possible to keep the amount of signaling constant regardless of the number of clusters.

Furthermore, in the present embodiment, when the number of codewords is 2 or more, the number of clusters may be fixed to 1.

Embodiment 2

In Embodiment 2 of the present invention, an RB available as a start position of clusters to allocate to a terminal is referred to as a start RB, and an RB available as an end position of the clusters is referred to as an end RB. The start RB and the end RB, or the start RB, or the end RB is collectively referred to as start/end RBs.

A configuration of a base station according to Embodiment 2 of the present invention is the same as the configuration of Embodiment 1 shown in FIG. 4, except for some functions, and thus only the different functions will be described with reference to FIG. 4.

Determination section 117 receives the number of codewords to allocate to each terminal from the control section or the like (not shown), and controls available start/end RBs of clusters to allocate to each terminal, according to the number of codewords. That is, the available start/end RBs of the clusters to allocate to each terminal are reduced as the number of codewords increases. Determination section 117 determines the available start/end RBs of the clusters to allocate to each terminal, based on the input number of codewords, and outputs the determined start/end RBs to scheduling section 118. For example, when the number of codewords is 1, each RB can be selected as the start/end RB. In contrast, when the number of codewords is 2, second, fourth, sixth, . . . RBs can be selected as the start/end RB.

Scheduling section 118 allocates the transmission band (frequency resource) of the transmission signal transmitted by each terminal, based on the number of codewords of the transmission signal to allocate to the terminal which is acquired from the control section or the like (not shown), the estimated value of reception quality output from estimation section 109, and the start/end RB output from determination section 117. The allocation control information (for example, the resource allocation information and the control information) representing the scheduling result is output to encoding section 101.

The allocation control information representing the scheduling result may be generated in association with the number of codewords and the start/end RB. For example, as shown in FIG. 9, the selectable start/end RBs may vary according to the number of codewords, and the resource allocation information may be generated in units of one RB when the number of codewords is 1, and the resource allocation information may be generated in units of two RBs when the number of codewords is 2.

A configuration of a terminal according to Embodiment 2 of the present invention is the same as the configuration of Embodiment 1 shown in FIG. 7, except for some functions, and thus only the different functions will be described with reference to FIG. 7.

Band identifying section 205 determines the available start/end RBs of the clusters to allocate to terminal 200, according to the number of codewords output from decoding section 204. That is, band identifying section 205 determines a smaller number of available start/end RBs of the clusters to allocate to each terminal, with respect to a larger number of codewords. Specifically, band identifying section 205 stores the correspondence between the number of codewords and the available start/end RBs of the clusters in advance, and determines the available start/end RB of the clusters based on the information on the number of codewords output from decoding section 204.

Band identifying section 205 determines the start/end RB of the transmission band allocated to terminal 200 from the available start/end RBs by using the control information output from decoding section 204. For example, band identifying section 205 judges that the resource allocation information is in units of 1 RB when the number of codewords is 1 and judges that the resource allocation information is in units of 2 RBs when the number of codewords is 2, and determines the start/end RB of the transmission band.

A signaling amount of the start/end RB in a case of reducing the available start/end RBs of the clusters to allocate to each terminal as the number of codewords increases will be described with reference to FIG. 10. FIG. 10 is based upon a premise that the system bandwidth is 6 RBs, FIG. 10A shows a case of selecting the start/end RB in units of 1 RB, and FIG. 10B shows a case of selecting the start/end RB in units of 2 RBs.

Figure 10A:
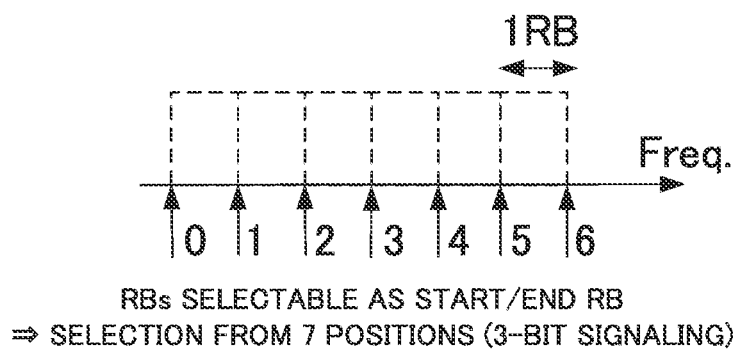
FIG. 10A is a view illustrating a signaling amount of start and end RBs.
Figure 10B:
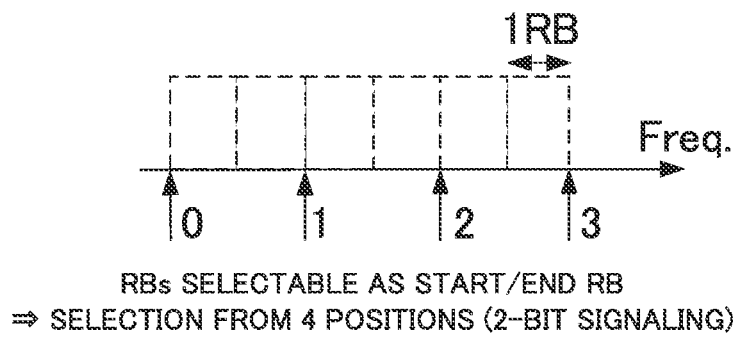
FIG. 10B is a view illustrating a signaling amount of start and end RBs.

As shown in FIG. 10A, in the case of selecting the start/end RB in units of 1 RB, the start/end RB is selected from 7 RBs (3 bits) of 0th to 6th RBs in FIG. 10A. However, as shown in FIG. 10B, in the case of selecting the start/end RB in units of 2 RBs, the start/end RB is selected from 4 RBs (2 bits) of 0th to 3rd RBs in FIG. 10B. In this way, the available RBs of the clusters are reduced such that the amount of signaling of the start/end RB to notify to the terminal changes from 3 bits to 2 bits. Therefore, it is possible to reduce the amount of signaling.

In a case where the space scheduling gain is high and the number of codewords is large, the start/end RBs according to the number of clusters to allocate to each terminal is reduced, whereby it is possible to reduce the amount of signaling while securing the scheduling gain.

As described above, according to Embodiment 2, the available start/end RBs of the clusters to allocate to each terminal are controlled according to the number of codewords of the transmission signal to allocate to the terminal. Therefore, it is possible to reduce the amount of signaling while securing a high scheduling gain.

Embodiment 2 and Embodiment 1 may be combined. For example, although it has been described that the number of codewords may vary according to the number of clusters, the codewords may be replaced with the available start/end RBs of the clusters to allocate to each terminal. That is, a correspondence relationship in which if the number of clusters is 1, 2, 3, or 4, the available start/end RBs of the clusters to allocate to each terminal are in units of 1 RB, 2 RBs, 3 RBs, or 4 RBs may be defined. As described in Embodiment 1, the start/end RBs according to the number of clusters may be selected such that the amount of signaling does not exceed the reference number of bits but is closest to the reference number of bits. For example, when the start/end RBs are in units of 1 RB, the number of clusters is limited to 1, and when the start/end RBs are in units of 2 RBs, the number of clusters is limited to 2. Also, when the start/end RBs are in units of 3 RBs and 4 RBs, the number of clusters is limited to 3 and 4, respectively. Also, when the number of clusters is 1, the start/end RBs are limited to units of 1 RB, and when the number of clusters is 2, the start/end RBs are limited to units of 2 RBs. Further, when the number of clusters is 3 and 4, the start/end RBs are limited to units of 3 RBs and 4 RBs, respectively. By using this, it is possible to adjust the number of clusters and the start/end RBs and to limit the amount of signaling to a number of bits which does not exceed the reference number of bits as described in Embodiment 1.

Embodiment 3

In Embodiment 3 of the present invention, an RB available as a start position of clusters to allocate to a terminal is referred to as a start RB, and an RB available as an end position is referred to as an end RB.

A configuration of a base station according to Embodiment 3 of the present invention is the same as the configuration of Embodiment 1 shown in FIG. 4, except for some functions, and thus only the different functions will be described with reference to FIG. 4.

Determination section 117 receives the number of codewords to allocate to each terminal from the control section or the like (not shown), and controls the available start RBs and end RBs of the clusters to allocate to the terminal, according to the number of codewords. Specifically, as the number of codewords increases, the available end RBs of the clusters to allocate to each terminal are selected in a range separated from the start RB. Determination section 117 determines the available start RBs and end RBs of the clusters to allocate to each terminal, based on the input number of codewords, and outputs the determined start RBs and end RBs to scheduling section 118. For example, with respect to the available end RBs, only RBs separated from the available start RB by a predetermined number of RBs or more are set as the available end RBs for the end RB.

Scheduling section 118 allocates the transmission band (frequency resource) of the transmission signal transmitted by each terminal, based on the number of codewords of the transmission signal to allocate to the terminal, the number of codewords being obtained from the control section or the like (not shown), the estimated value of reception quality output from estimation section 109, and the start RBs and the end RBs output from determination section 117. The allocation control information (for example, the resource allocation information and the control information) representing the scheduling result is output to encoding section 101.

A configuration of a terminal according to Embodiment 2 of the present invention is the same as the configuration of Embodiment 1 shown in FIG. 7, except for some functions, and thus only the different functions will be described with reference to FIG. 7.

Figure 11A:
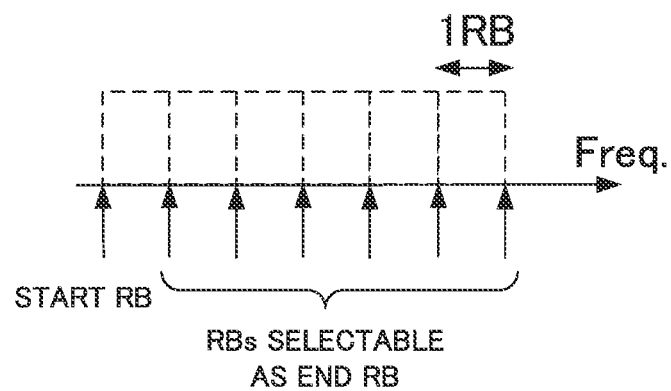
FIG. 11A is a view illustrating RBs selectable as an end RB according to the number of codewords.
Figure 11B:
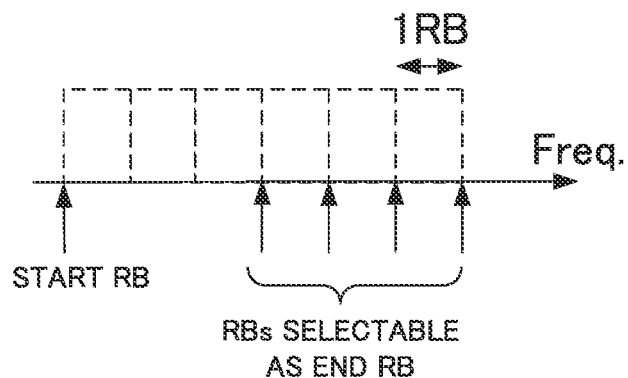
FIG. 11B is a view illustrating RBs selectable as the end RB according to the number of codewords.

Band identifying section 205 controls the available start RBs and end RBs of the clusters to allocate to terminal 200, according to the number of codewords output from decoding section 204. Specifically, as the number of codewords increases, the available end RBs of the clusters to allocate to terminal 200 are selected in a range separated from the start RB. That is, band identifying section 205 stores the correspondence between the range separated from the start RB for the available end RBs of the clusters and the number of codewords in advance, and determines the available start RBs and end RBs of the clusters based on the information on the number of codewords output from decoding section 204. Band identifying section 205 determines the start RB and end RB of the transmission band allocated to terminal 200 from the available start RBs and end RBs by using the control information output from decoding section 204. For example, when the number of codewords is 1, the end RB is selectable from RBs separated from the start RB by 1 RB or more (see FIG. 11A), and when the number of codewords is 2, the end RB is selectable only from RBs that are 2 RBs or more distant from the start RB, and when the number of codewords is 3, the end RB is selectable only from RBs 3 RBs or more distant from the start RB (see FIG. 11B).

As described above, according to Embodiment 3 of the present invention, the available end RBs of the clusters to allocate to each terminal are selected in a range separated from the start RB, according to the number of codewords of the transmission signal to allocate to the terminal. Therefore, it is possible to reduce the amount of signaling while securing a high scheduling gain.

In the present embodiment, it has been described that the number of clusters or the start/end RBs of the clusters are restricted according to the number of codewords. However, the number of clusters or the start/end RBs of the clusters may be restricted according to the number of layers or the number of streams. For example, in a case where the number of codewords corresponds one-to-one with the number of layers or the number of streams, the number of codewords may be replaced with the number of layers or the number of streams. Further, even in a case where the number of codewords corresponds one-to-many with the number of layers, the number of codewords can be replaced with the number of layers or the number of streams. For example, even when the number of codewords is 1, in a case where control information (cyclic shift and the like) changes in each layer or each stream, the amount of control information increases as the number of layers or the number of streams increases. Accordingly, the number of clusters is restricted according to the number of layers or the number of streams (FIG. 12). Also, since the amount of control information increases as the number of layers or the number of streams increases, the start/end RBs of the clusters are restricted according to the number of layers or the number of streams (FIG. 13).

In each above-mentioned embodiment, the number of bits for the control information and the allocation is not limited to the number of bits shown in tables.

Each above-mentioned embodiment has been described on the premise of uplink. However, the present invention may be applied to downlink. For example, in Embodiment 3, it has been described that "the number of uplink clusters is controlled according to the number of uplink codewords" and "the start/end RBs of uplink clusters are restricted according to the number of uplink codewords." However, "the number of downlink clusters may be controlled according to the number of downlink codewords," and "the start/end RBs of downlink clusters may be restricted according to the number of downlink codewords."

Further, in each above-mentioned embodiment, it has been described that the number of clusters or the start/end RBs of the clusters are controlled according to the number of codewords. However, the control is not limited to the number of codewords. The number of codewords may be replaced with a predetermined block constituting a data signal. For example, the number of codewords may be replaced with the number of layers to which the data signal is allocated, and may be replaced with the number of resource blocks (RBs) to which the data signal is allocated or the number of consecutive bands (the number of clusters) to which the data signal is allocated.

Each above-mentioned embodiment has been described on the premise that the base station controls the number of clusters or the start/end RBs of uplink clusters according to the number of uplink codewords in the base station, and, according to this, the terminal performs uplink transmission. However, the present invention is not limited thereto. The terminal may determine the number of codewords or the start/end RBs of uplink clusters by itself and control the number of clusters or the start/end RBs of uplink clusters based on the same method as the present invention, and, according to this, the base station may perform uplink reception. Further, the base station may determine the number of downlink codewords and control the number of clusters or the start/end RBs of downlink clusters based on the same control method as the present invention, and, according to this, the terminal may perform downlink reception.

Also, although cases have been described with the above embodiment as examples where the present invention is configured by hardware, the present invention can also be realized by software.

Each function block employed in the description of each of the aforementioned embodiments may typically be implemented as an LSI constituted by an integrated circuit. These may be individual chips or partially or totally contained on a single chip.

"LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

In the above-mentioned embodiments, antennas have been described. However, the present invention is similarly applicable to an antenna port.

The antenna port refers to a theoretical antennal made of one or a plurality of physical antennas. That is, the antenna port is not necessarily limited to one physical antenna but may be an antenna array or the like made of a plurality of antennas.

For example, in the 3GPP LTE, how many physical antennas constitute the antenna port is not defined, but the antenna port is defined as a minimum unit in which the base station can transmit different reference signals.

Further, the antenna port may be defined as a minimum unit for multiplying the weight of precoding vectors.

The disclosure of Japanese Patent Application No. 2009-031652, filed on Feb. 13, 2009, including the specification, drawings and abstract, is incorporated herein by reference in its entirety.

INDUSTRIAL APPLICABILITY

The communication apparatus and the communication method according to the present invention can be applied to a mobile communication system such as LTE-Advanced.

The invention claimed is:

1. An integrated circuit comprising:
control circuitry which, in operation, controls allocation of one cluster or a plurality of clusters to a terminal, the plurality of clusters being inconsecutive in a frequency domain, and each cluster being comprised of resource blocks that are consecutive in the frequency domain; and
a transmission circuitry which, in operation, controls transmission, to the terminal, of downlink control information including resource block assignment information that indicates the resource blocks of which the allocated one cluster or the allocated plurality of clusters are comprised,
wherein the downlink control information is transmitted with a downlink control information (DCI) format that is used for scheduling in uplink, the DCI format having a size, which is different according to a number of codewords, a number of layers, or a number of streams, and which is same, regardless of a number of clusters allocated to the terminal, for each number of codewords, each number of layers, or each number of streams, wherein the size of the DCI format is a total number of bits included in the DCI format.

2. The integrated circuit according to claim 1, wherein the DCI format has a same size according to a maximum value of the number of clusters for each number of codewords, each number of layers, or each number of streams.

3. The integrated circuit according to claim 1, wherein a size of the DCI format increases as the number of codewords, the number of layers, or the number of streams increases.

4. The integrated circuit according to claiml, wherein a size of the resource block assignment information indicating the resource blocks of which the plurality of clusters are comprised is different from a size of the resource block assignment information indicating the resource blocks of which the one cluster is comprised.

5. The integrated circuit according to claim 1, wherein a number of bits used to transmit the resource block assignment information indicating the resource blocks of which the plurality of clusters are comprised is larger than a number of bits used to transmit the assignment information indicating the resource blocks of which the one cluster is comprised.

6. The integrated circuit according to claim 1, wherein a number of resource blocks, which is a unit for allocating frequency resources, is different between a case where the plurality of clusters are allocated and a case where the one cluster is allocated.

7. The integrated circuit according to claim 1, wherein the resource block assignment information indicates the resource blocks in units of a different number of resource blocks between a case where the plurality of clusters are allocated and a case where the one cluster is allocated.

8. The integrated circuit according to claim 1, wherein the downlink control information further includes modulation and coding scheme (MCS), transmission power control (TPC) command, new data indicator (NDI) and cyclic shift.

9. The integrated circuit according to claim 1, wherein the downlink control information further includes information indicating the number of codewords, the number of layers, or the number of streams.

10. The integrated circuit according to claim 1, wherein a maximum value of the number of clusters is restricted to a predetermined number for each of the numbers of codewords, the numbers of layers or the numbers of streams.

* * * * *